Nov. 13, 1951  E. J. NOHL  2,574,932
SPECIAL PURPOSE EAR CORN RAKE
Filed Feb. 20, 1950

Edwin J. Nohl
INVENTOR.

Patented Nov. 13, 1951

2,574,932

UNITED STATES PATENT OFFICE 2,574,932

SPECIAL PURPOSE EAR CORN RAKE

Edwin J. Nohl, Hancock, Minn., assignor of fifty per cent to John E. Erickson, Hancock, Minn.

Application February 20, 1950, Serial No. 145,137

2 Claims. (Cl. 56—400.01)

The present invention relates to certain new and useful improvements in special purpose rake constructions and has more particular reference to a weighty but easily wieldable, special purpose rake which may be used with requisite efficiency and satisfaction for dislodging, loosening and expeditiously raking packed, entangled ears of corn from a corncrib or pile to a conveyor-drag, this as a step convenient to shelling the corn.

It is a matter of common knowledge that when ear corn is racked in a corncrib or stacked in a pile, the husks become so intermingled and tightly packed together that separating the ears as a step preparatory to shucking and shelling involves painstaking and time-consuming efforts. This is especially so during cold weather when the ears become stuck together. Picks, pitchforks, garden rakes, and makeshift implements are used for untangling and dislodging the pack. Then, using an ordinary garden rake the ears of corn are raked, in usual hand fashion, from the crib or pile, as the case may be, to the usual conveyor-drag.

Despite the difficulties which are encountered year in and year out, and though there is a crying need for a special ear corn handling rake, little, if anything, has been done to cope with the problem. A proper solution, however, is thought to reside in the adoption and use of a rake of a heavy-duty but easily wieldable type. With a view toward achieving the ends wanted, I have evolved and produced a special kind of rake which, though it resembles any ordinary type of rake, is nevertheless in a class by itself.

Briefly summarized, I have evolved and produced a simple and practical rake which is characterized by a horizontally elongated head member, a plurality of comparatively and significantly long, widely spaced, vertical tines rigidly mounted on and extending angularly from said head member, the latter and said tines being of appreciable total mass and the aggregate weight of the head member plus the tines affording the user the seemingly necessary mass and weight factors essential, in combination with a suitable handle, to overcome the difficulties encountered with the use of regular garden rakes and makeshift tools.

In reducing to practice a preferred embodiment of the rake, the head is made up to include a comparatively heavy channel iron some fourteen inches, more or less, in length, the open side of the channel facing downwardly and the upper ends or shank portions of the tines being fitted between the vertical side flanges and secured firmly in place. Four nine-inch tines are used and these are at least four inches apart to prevent clogging with debris and the lower ends of the prongs have their outward surfaces bevelled in a manner to provide knife-like cutting edges and also to facilitate their riding easily over the ears of corn as the rake is worked toward and from the user.

Then, too, novelty is predicated on the use of the stated channel iron which has a central notch to accommodate an end portion of the handle anchoring socket, said socket serving to accommodate interchangeable long and short handles and the end which is attached to the channel iron being of a diameter to expose an end of the handle to facilitate driving same from the socket in case it becomes stuck.

Other objects and advantages will become more readily apparent from the following description and the accompanying illustrative drawings.

In the accompanying sheet of drawings, wherein like numerals are employed to designate like parts throughout the views.

Figure 1:
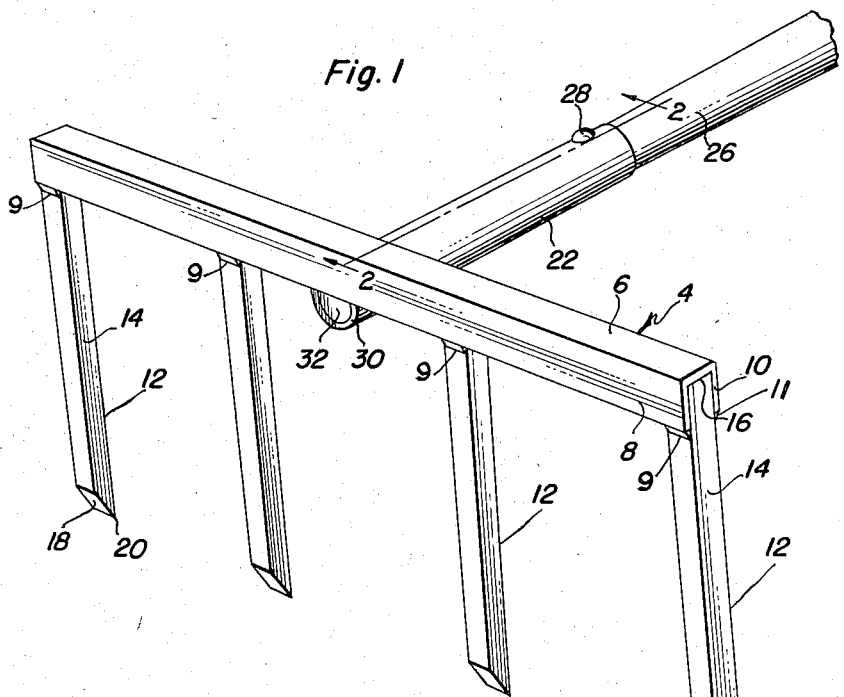
Figure 1 is a perspective view of a special-made rake for ear corn constructed in accordance with the principles of the present invention.

Referring now to the drawings by distinguishing reference numerals and accompanying lead lines, the head, sometimes called the back, of the rake is denoted by the numeral 4 and this is a so-called channel-iron and is usually between fourteen and fifteen inches in length, is comparatively heavy and includes a web 6 and vertical spaced channel-forming flanges 8 and 10. The channel is open at opposite ends and the main open side faces downwardly, that is, when the rake is in use.

There are four widely spaced tines 12 and each is a comparatively heavy length of metal and the cross-section is such that the upper end of the shank 14 fits snugly between the flanges 8 and 10, where it is welded or otherwise secured as at 9 firmly in place. The upper end of the shank 16 abuts against the web 6 and the adjacent portion is secured between the flanges 8 and 10 as shown. The tines are some four inches apart and are therefore sufficient distances from each other to provide a rake which is sufficiently "wide open" to minimize the likelihood of clogging. For the most part, the tines being heavy and widely spaced, the rake is consistently selfclearing. The tines are rectangular in cross-section and the lower end portions are mitered to provide upwardly and outwardly inclined bevels or surfaces 18 and feather-edge tips 20 which function as cutting blades. The sharp edges will penetrate spaces between the husk-covered ears and by properly manipulating the rake, the ears may be easily pried and wedged apart. It might also be mentioned here that these wedge-shaped tip portions come in handy in enabling the user to pry loose a few slats or boards from the wooden type corncrib (not shown), whereby to provide a discharge opening at the bottom of the crib which allows the ears of corn, after they have been loosened and dislodged, to be dragged out. Then, the ears of corn may be raked up and drawn to within handling distance of the conveyor-drag (not shown).

By making the overall head of considerable mass and weight, by using a heavy channel iron for the back or head, by widely spacing the prongs or tines and bevelling the ends to wedge-form, a rake is had which is in no manner comparable to the makeshift hoes, forks and garden rakes commonly relied upon at the ear corn shelling season.

Figure 2:
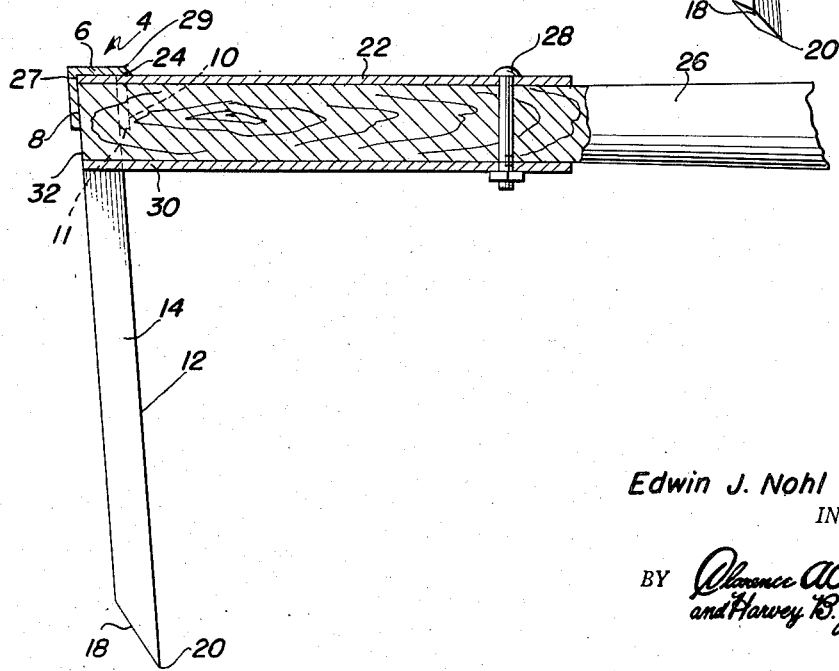
Figure 2 is an enlarged fragmentary sectional and elevational view of the rake shown in Figure 1, the section being on the line 2—2 of Figure 1.

The aforementioned ferrule or socket is tubular and open ended and is denoted by the numeral 22. A notch 24 is formed in the flange 10 at a center point and opens through the lower edge 11 and an end portion of the socket is secured therein, as shown in Figure 2. The socket is adapted to accommodate interchangeable handles 26 of varying lengths and the handle is held in place by a bolt 28 passing through the socket and handle as shown. It will be noticed that the left hand or attached end of the socket abuts the interior of the flange 8, is suitably welded thereto as at 29, and is of a greater diameter than the cross-section of the channel iron. Consequently, approximately one-half portion of the socket, as at 30, depends below the channel iron to expose an end portion 32 of the handle. Therefore, in case the handle should become stuck, the end 32 is available and any suitable implement (not shown) may be used for driving the handle out replacing same with another handle. It is sometimes desirable to use a short handle or a long handle, depending upon conditions, and the construction shown permits such results to be attained.

There is another point to be made, and that is that the tines are not at 90° angles in respect to the longitudinal center line of the handle. Instead, they are slightly canted in a direction toward the handle, and the degree of angularity is usually about 83°. It follows, therefore, that the tines may be said to be at slight acute angles in respect to the axis of the handle.

Needless to say, I am aware of the state or development of the art, but know of no special rake which is precisely constructed as herein shown and described.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An easily wieldable special purpose rake for dislodging, loosening and expeditiously raking intermingled ears of corn from a corncrib or a pile of stacked corn to a conveyor-drag at corn shelling time comprising a one piece horizontal down facing open-ended channel-iron including a web and depending inward and outward spaced parallel flanges, said inward flange having a centered notch opening through the lower edge of said flange, a tubular open-ended handle fastening socket disposed at right angles to said channel-iron having an open end portion passing through said notch, bearing against said web and secured to an interior surface of said outward flange, said socket being of a diameter approximately twice that of the cross-section of said channel-iron and having upper half-portion housed in the channel of said channel-iron and a lower half portion depending below the lower edges of both flanges, an insertable and removable handle fitted into said socket and having an end portion accessibly uncovered and exposed in relation to said outward flange, means removably fastening the handle in said socket, and tines carried by said channel-iron.

2. The structure specified in claim 1, wherein said tines are square in cross-section with their upper end portions fitted against said web and secured between the flanges of said channel-iron, the lower ends of said tines being mitered and providing knife-edges, and all of said tines being disposed at approximately 83 degree angles in respect to the longitudinal center line of said socket.

EDWIN J. NOHL.

REFERENCES CITED

The following references are of record in the file of this patent:

UNITED STATES PATENTS

| Number | Name | Date |
|---|---|---|
| 94,118 | Johnston | Aug. 21, 1869 |
| 180,131 | Hertzig | July 25, 1876 |
| 654,645 | Keiller | July 31, 1900 |
| 838,417 | Jenkins | Dec. 11, 1906 |
| 1,115,881 | West | Nov. 3, 1914 |
| 1,232,539 | Harrison | July 10, 1917 |
| 1,275,382 | Camp | Aug. 13, 1918 |
| 1,705,441 | Cramer | Mar. 12, 1929 |
| 1,888,991 | Larson | Nov. 29, 1932 |
| 2,196,129 | Swisher | Apr. 2, 1940 |

FOREIGN PATENTS

| Number | Country | Date |
|---|---|---|
| 357,536 | Germany | Aug. 26, 1922 |